US008171892B1

(12) United States Patent
Horgan

(10) Patent No.: US 8,171,892 B1
(45) Date of Patent: May 8, 2012

(54) MOTION CONTROL HARNESS FOR A MEDIUM TO LARGE DOG

(76) Inventor: Jason Horgan, Davie, FL (US)

(*) Notice: Subject to any disclaimer, the term of this patent is extended or adjusted under 35 U.S.C. 154(b) by 0 days.

(21) Appl. No.: 13/163,869

(22) Filed: Jun. 20, 2011

Related U.S. Application Data

(63) Continuation of application No. 12/813,890, filed on Jun. 11, 2010, now Pat. No. 7,963,256, which is a continuation of application No. 12/620,814, filed on Nov. 18, 2009, now Pat. No. 7,963,255.

(60) Provisional application No. 61/115,702, filed on Nov. 18, 2008.

(51) Int. Cl.
A01K 27/00 (2006.01)
A01K 15/04 (2006.01)

(52) U.S. Cl. .................... 119/792; 119/816
(58) Field of Classification Search .............. 119/814, 119/816, 817, 818, 726, 810; 54/71
See application file for complete search history.

(56) References Cited

U.S. PATENT DOCUMENTS

| 78,082 | A | 5/1868 | Gray |
|---|---|---|---|
| 1,084,169 | A | 1/1914 | Russell |
| 2,534,727 | A | 12/1950 | Moyle |
| 3,994,264 | A | 11/1976 | Flynt |
| 4,528,944 | A | 7/1985 | Reed et al. |
| 5,845,606 | A | 12/1998 | Hartman |
| 6,354,247 | B1 | 3/2002 | Andrews |
| 6,708,650 | B1 | 3/2004 | Yates |
| 7,131,400 | B2 | 11/2006 | Wanveer et al. |
| 7,150,248 | B2 | 12/2006 | Hodl |
| 7,249,447 | B2 | 7/2007 | Diaz |
| 7,284,504 | B1 | 10/2007 | Purschwitz et al. |
| 7,992,368 | B2 | 8/2011 | Bentley |
| 2007/0028568 | A1* | 2/2007 | Diaz .................. 54/71 |
| 2008/0250761 | A1* | 10/2008 | Bentley .............. 54/71 |

* cited by examiner

Primary Examiner — Monica Williams
(74) Attorney, Agent, or Firm — Malin Haley DiMaggio Bowen & Lhota, P.A.

(57) ABSTRACT

A restraint harness for a dog, particularly a dog of medium size and larger, including a conventional adjustable dog harness or collar and an attached control extension member. The control extension member includes a plurality of straps configured to extend to the hind end of the dog and a motion control cord that is interlaced in and between the conventional adjustable dog harness and the control extension member. The motion control cord encircles the dog's hind legs and can be tightened around the thighs with minimal force, where such tightening substantially restrains the dog without causing injury to the dog.

8 Claims, 4 Drawing Sheets

US 8,171,892 B1

MOTION CONTROL HARNESS FOR A MEDIUM TO LARGE DOG

This application is a continuation of pending U.S. patent application Ser. No. 12/813,890, which is a continuation-in-part of U.S. patent application Ser. No. 12/620,814, which claims the benefit of U.S. provisional patent application Ser. No. 61/115,702.

BACKGROUND OF THE INVENTION

1. Field of the Invention

This invention relates generally to a harness for a medium to large dog, and specifically to a motion control harness for a medium to large dog that allows the operator to inhibit the movement or motion of medium to large dogs when desired.

2. Description of Related Art

It is quite customary for a dog owner to use a harness or collar with a leash when walking for their dog. Conventionally dog harnesses and collars, when connected to a leash, have been made to allow the user to walk with the dog and control the movement of the dog so that the dog cannot get away or be subject to danger from automobile traffic. It is also desirable, for safety purposes, to be able to control the dog in the instance where other people or animals are present to prevent any type of undesired interaction. Unfortunately, when it comes to walking a medium to large dog, the dog can be overpowering. A conventional harness, which is usually around the front chest and upper body portion of the dog, is not sufficient. A conventional collar, which is usually around just the neck of the dog, provides even less control and a greater chance of injury than a harness. Even with the strongest of harnesses and collars, it may get to the point where the dog owner is unable to control the dog's movement. The hind leg muscles, which provide the majority of the pulling power in medium to large dogs, are very strong. In such a circumstance it can be very dangerous for a dog owner to walk a medium to larger dog using a harness or collar because the dog could literally over power the person holding the leash.

There have been many attempts to provide control over dogs in the past. For example, there are apparatuses on the market that control a dog by being positioned on the dog's face. Many dogs, however, resist wearing them due to facial discomfort. U.S. Pat. No. 6,354,247, issued to Andrews on Mar. 12, 2002, describes a method and apparatus for controlling an animal. The front harness includes a pair of loops that go around the lower portion of a dog's hind legs to control the dog's actions. Because of the loop relationship with the cord and harness and the loop position on the dog's legs, it is the Applicant's position that this device does not properly control a medium to large animal. First, the loops below the hocks (ankles) will not control the animal because the main muscles used for power are located in the upper thigh region (quadriceps/hamstrings). Second, loops around the hock (ankle) are dangerous to the animal as the animal can become tied up and injure its legs. Third, due to the change in distance between the loops and their connection on the harness during the dog's stride, the loops will have a tendency to loosen and fall off the leg. Finally, the direction to which pressure is applied to the hock(ankle) is not natural and can lead to joint, muscle, and bone injury. U.S. Pat. No. 3,994,264, issued to Flynt on Nov. 30, 1976, shows a dog restraining harness. U.S. Pat. No. 3,994,264 is a jump restraint not a walking control device. U.S. Pat. No. 2,534,727 is another attempt at restraint for a dog. It is not motion controlled. The harness is not dynamic. The owner has to stop the dog and adjust the straps. Furthermore, the device limits the dog's stride even if the dog slows down or stops pulling unless it is re-adjusted manually. Again the harness shown does not properly control the animal especially for a medium to large dog.

The Applicant's invention described herein includes a motion control cord with a loop and that is interlaced with a lower body harness. The cord/loop engages particular hind leg muscles (quadriceps, hamstrings, etc.) of medium to large dogs. When tightened around the dog's leg muscles the cord/loop apparatus resists movement so that the dog is not able to pull or charge away from the person holding the restraint cord. The cord also distracts the dog's attention by creating an awkward sensation around the main muscles of power (quadriceps and the like) so that they lose focus on whatever caused them to pull initially. The apparatus works by transferring the energy the dog uses to pull into tightening the loops around the thigh muscles which result in restraint of the dog. By encircling large muscle groups(quadriceps, hamstrings, etc.) there is no risk of injury to the dog's legs.

SUMMARY OF THE INVENTION

A restraint harness for a dog, particularly a dog of medium size and larger, including a conventional adjustable dog harness or collar and an attached lower body harness or control member. A conventional adjustable dog harness is well known in the art and typically includes an adjustable body encircling strap for the front torso of the dog and a second perpendicular strap that can engage the front chest of the dog, connected at each end to the front torso strap. A conventional collar is well known in the art and usually encircles the dog's neck area and has a ring connector to which a leach or other apparatus can be attached.

Attached to the dog harness is the harness control extension, comprising a center line strap connected by a fastener to the body encircling strap that is disposed along the spine of the dog from a front portion of the animal to the rear hind portion of the animal. The center line strap has a pair of adjustable lateral straps connected to the center line strap at the rear hind portion of the dog. Each of the lateral straps includes an "O" ring rigidly fastened to the end of them.

In one embodiment, the front harness also has a left and right "O" ring attached on each side by side snap hooks that are used in conjunction with a motion control or restraint cord which is interlaced into and between the dog harness and the harness control extension.

The motion control cord is attached at one end to one "O" ring of the lateral strap on each side. The control cord is then formed in a pair of loops on each side, with each being large enough to encircle a hind leg of the dog. The cord passes back through the "O" ring on each lateral strap on each side. Thus, the control cord has a pair of retractable loops that can be made quite small in diameter by pulling on the control member. Pulling on the control member causes tightening of the loops that encircle the upper hind leg muscles of the dog. In addition, in the embodiment with the additional "O" ring, the control cord will pass through the "O" ring that is attached to the front harness of the dog on each side. In the other embodiment, the control cord passes through a portion of the center line strap. Finally, the control cord will then extend above the animal into either an included control member or into a connection ring to which a normal leash can be attached.

In one embodiment, the operator of the control harness can potentially walk with the dog at a walking pace with sufficient grip on the control member. The operator's hand engages the control member while walking the dog. The control cord can be somewhat like a leash as the sole restraint. The owner can also attach a leash to the front harness of the dog if trying to train the dog to walk on a regular leash or conventional harness eventually without the control cord.

In another embodiment, the operator can attach a conventional leash to the connection ring.

The main purpose of the control cord is that if a medium to large dog tries to charge or run, the forward motion will cause the control cord that is firmly held by the operator to squeeze the upper leg muscle of the dog on each side (right leg and left leg) which will restrain the leg muscles and prevent the dog from moving forward. This action happens quite quickly by pulling on the control cord or by the dog attempting to pull away from the operator who is firmly holding the control cord.

The Applicant has found that the control cord is very effective for stopping a medium to large dog from pulling because that the control cord restrains the upper muscles of the dog's hind legs preventing the dog from moving forward. In one embodiment, the force and direction of the control cord is also effectively redirected through the "O" rings on the front harness that redirect the direction of the control cord from the rear legs to the front harness to the operator in control of the control cord well above the dog.

An object of this invention is to provide a dog control harness to prevent the animal from charging another person or animal, while not risking injury to the dog.

It is another object of this invention to provide an animal harness especially suited for medium to large dogs that can restrain the dog's rear leg muscles so that the operator can restrain the dog from undesired movement during an operation such as walking the dog.

Another objective of this invention is to be used as a training tool with a regular leash attached to the front harness in hopes of eventually removing the control cord. Another objective of this invention is to be used on dogs that have neck or back medical conditions where using a standard leash or harness would not be desirable.

PREFERRED EMBODIMENT OF THE INVENTION

Figure 1:
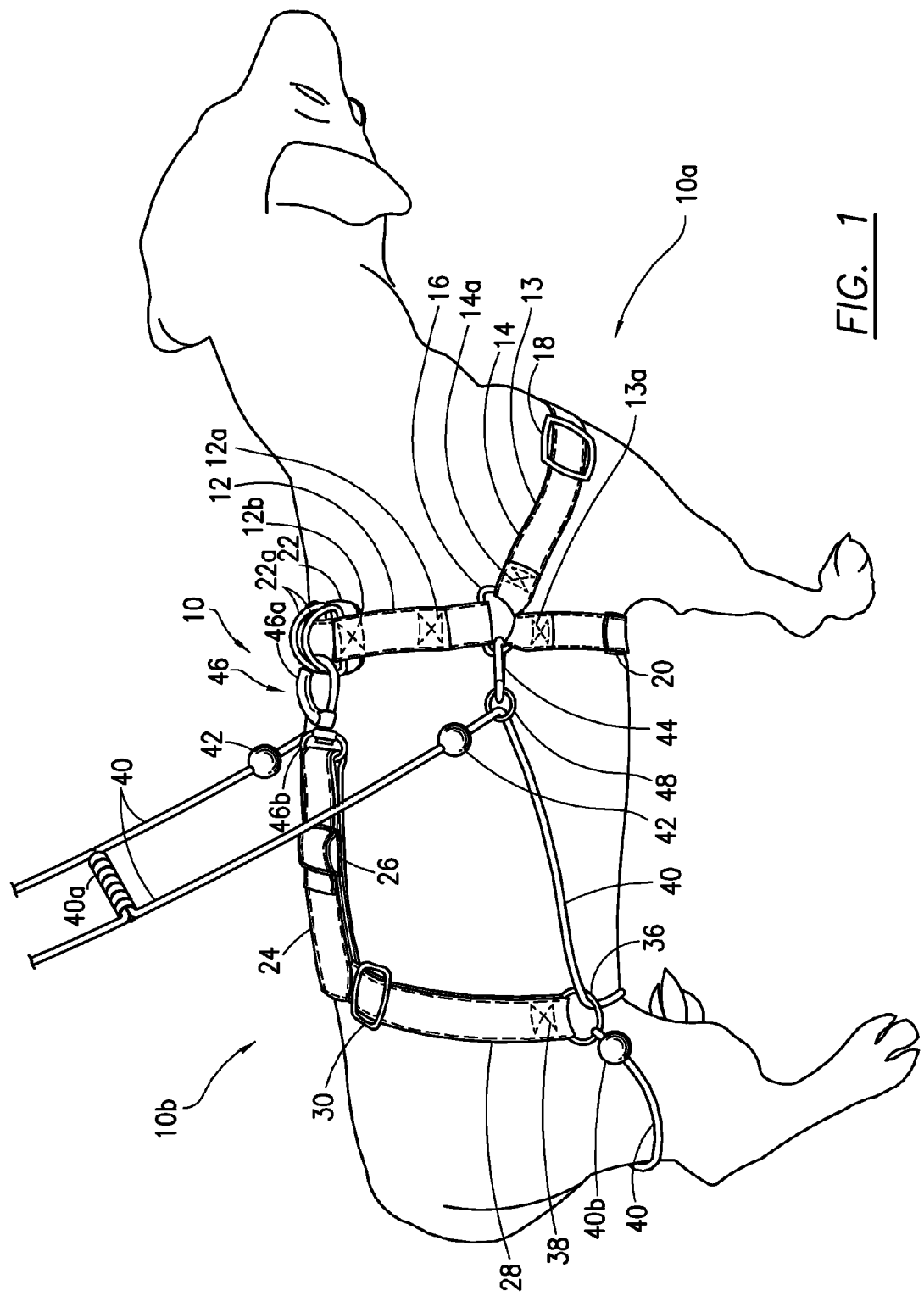
FIG. 1 shows a perspective view of one embodiment of the present invention.
Figure 2:
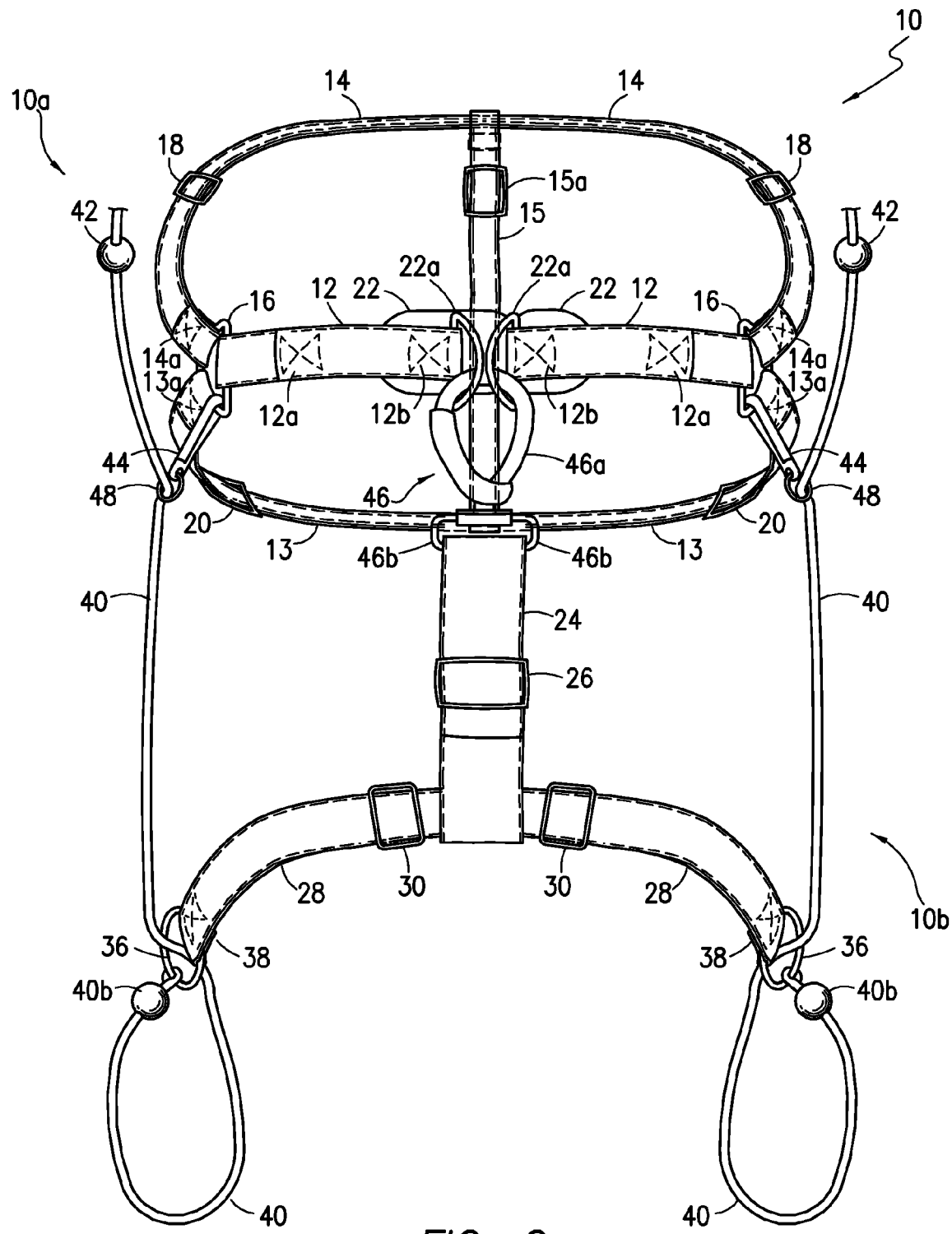
FIG. 2 shows a top plan view of the harness as shown in FIG. 1.

Referring now to the drawings and in particular FIGS. 1 and 2, a control harness 10 is shown. Particularly, FIG. 1 shows the control harness 10 attached to a representation of a large dog while FIG. 2 shows a more complete view. The control harness 10 is the combination of a conventional adjustable dog harness 10a, which is well known in the art, and a control extension 10b that is attached to the dog harness 10a. Two side cords are a part of and extend from the control extension 10b to an undetermined length, and provide the primary restraining action. A control member 40a, through which the proximal ends of the two side cords 40 pass, provides a handle for the user 40a.

The control harness 10 is comprised of several narrow thin but very strong straps preferably made of an artificial fabric such as nylon. Nylon straps are extremely strong and have a lot of holding power and are desirable because of their light weight and flexibility. In addition, this material allows the control harness 10 to be machine washable. The dog harness 10a includes two body torso straps 12 which are made up of two identical narrow rectangular nylon straps on opposite sides of the dog that are each connected to a "D" ring 16 at one end with a loop 12a that is sewn into the strap 12. At the opposite end of the "D" ring 16, the straps 12 have opposing male/female ends of a plastic fastener 22, where the ends can engage to lock the straps 12 together at the middle of the dog's back. Above the plastic fastener 22, each strap 12 has another "D" ring 22a, and each strap 12 is also attached to the "D" ring 22a with a loop 12b that is sewn into the strap 12. Only one of the straps 12 is visible in FIG. 1, but the opposing strap 12 is identical in the way it connects to the "D" ring 16, the plastic fastener 22, and the "D" ring 22a. The straps 12 proceed up to the upper portion of the dog's back and are fastened together in the middle of the dog's back when the ends of the plastic fastener 22 are engaged together. The "D" ring 16 connects the straps 12 covering the sides and back of the dog to with an encircling strap 13 that, when connected to the straps by way of the "D" ring 16, encircle the dog by running to the rear of the dog's front legs and across the dog's chest. The encircling strap 13 is attached to the "D" ring 16 with a loop 13a that is sewn into the encircling strap 13. The end of the encircling strap 13 not shown in FIG. 1. A front chest strap 14 is also connected at one end to the "D" ring 16 and proceeds around to the left side of the dog in front of the dog's front legs and similar connection and "D" ring 16 as shown in FIG. 1. The chest strap is attached to the "D" ring 16 with a loop 14a that is sewn into the chest strap 14. An under strap 15 runs under the dog's chest from the chest strap 14 to the encircling strap 13. The under strap 15 is adjustable with a buckle 15a. The straps 12, 13, 14, and 15 represent basically a conventional harness. This harness is adjustable with buckles 18 and 20 for different size dogs so that it can fit comfortably yet be tight enough for the dog not to be able to get out of the straps.

To attach the control extension 10b to the dog harness 10a, an "O" clip 46 is attached to the center strap 24 of the control extension 10b is attached to the "D" rings 22a at the midsection along the dog's spine area. The "O" clip 46 has a front area 46a with a circular snap hook that is attached to a rear area 46b that allows a strap to be laced into it. The center strap 24 is positioned along the mid-spinal portion of the animal from its upper-mid back to its rear hind back and is adjustable in length with a buckle 26. In addition, on each side of the dog, a side snap hook 44 attaches to the "D" ring 16.

The center strap 24 terminates near the rear of the dog into lateral straps 28, which are affixed perpendicular to the end of strap 24 and overlaps on each side of the dog's back terminating on each side in an "O" ring 36. Thus, the lateral straps 28 extend from each side of strap 24 down to each side of the dog. The lateral straps 28 are adjustable in length by using a buckle 30, where one buckle 30 is located on the lateral straps on each side of the strap 24, to accommodate different size dogs.

Attached on each end of the lateral straps 28 are "O" rings 36, the lateral straps 28 pass through the "O" rings 36 and fold back onto themselves, where they are firmly attached by threads 38 that are sewn into the lateral straps 28. This creates a permanent attachment of the "O" rings 36. The lateral straps 28 shown in FIG. 1 appear on the left side of the dog in an identical manner.

Two very strong but light weight side cords 40 are attached on each side of the control harness 10. Each side cord 40 begins at the "O" ring 36, where it is permanently connected by having the end of the side cord 40 looped around the "O" ring 36 and locked in position by a permanent cord stop 40b.

The side cord 40 then passes to the rear of the dog's hind legs and then completely around the dog's hind legs, where it passes through the "O" ring 36 and fed up to and through "O" ring 48 that is attached to the side snap hook 44. The cord fastenings are the same on both sides of the dog as shown in FIG. 1 and FIG. 2. An adjustable cord stop 42 is positioned near "O" ring 48 to control how much the side cord 40 passes through "O" ring 48 towards the hind end of the dog. If too much side cord 48 is available, the control harness would be too loose on the dog. If too little side cord 40 is available, the control harness would effectively be constantly engaged and the dog would be met with constant resistance when trying to move its hind legs. Therefore, the adjustable cord stop allows the user to adjust how much side cord 40 is available below the "O" ring 48.

Once the side cords 40 are passed through the "O" ring 48 they continue towards the user and the control member 40a. The side cords 40 engage the control member 40a by each entering opposing ends of the control member 40a, passing each other in opposite directions inside the control member 40a, and each exiting the end from with the opposite side cord 40 entered the control member 40a.

The side cord 40, the lateral straps 28, and the "O" ring 36 are strategically positioned to ensure the side cord 40 encircles the upper hind leg muscles of the dog. The side cord 40 is in such a position around the upper hind leg muscles of the dog that it can restrain these muscles when less side cord 40 is made available to the control extension 10b, which forces the loops created by the side cord 40 that are around the hind legs to get smaller and smaller. The user would make less side cord 40 available by pulling the control member 40a, which acts to pull both side cords 40 simultaneously. The end of each side cord 40 that exits the control member 40a can be used to adjust the height of the control member 40a above the dog by adjusting the position of the control member 40a on the side cords 40. The operator can decrease the height of the control member 40a by pulling on the end of each side cord 40 where it exits the control member, thereby lessening the length of each side cord 40 below the control member 40a. The operator can increase the height of the control member 40a by pulling on the end of each side cord 40 where it enters the control member 40a, thereby increasing the length of each side cord 40 below the control member 40a. Once the control member 40 is adjusted to the comfortable height for the user, the position can be secured by tying the end of each side cord 40 where it exits the control member 40a is tied into a square knot with the adjacent side cord 40 that is entering the control member 40a. The user can readjust the height of the control member 40a by untying and adjusting the position of the control member 40a on the side cords 40.

The upper spine strap 24 and the lateral straps 28 are adjustable in length for fitting a specific size dog. The device could be used with another conventional leash that could be attached to the front harness portion through "D" rings 22a. This means that the operator walking the dog could pull and direct the dog using the leash through the "D" rings 22a and at the same time holding the control member 40a. If the dog were to jump forward or lunge forward, the operator could pull the control member 40a or allow the motion of the dog lunging forward to cause a reduction in the size of the loop around the dog's legs, restraining the dog's muscles. The control extension 10b can be easily removed by disengaging the "O" clip 46 and the side snap hooks 44 from the dog harness. It is noted that if the operator pulls on the control member 40a behind the dog, the dog will often walk backwards toward the operator.

Figure 3:
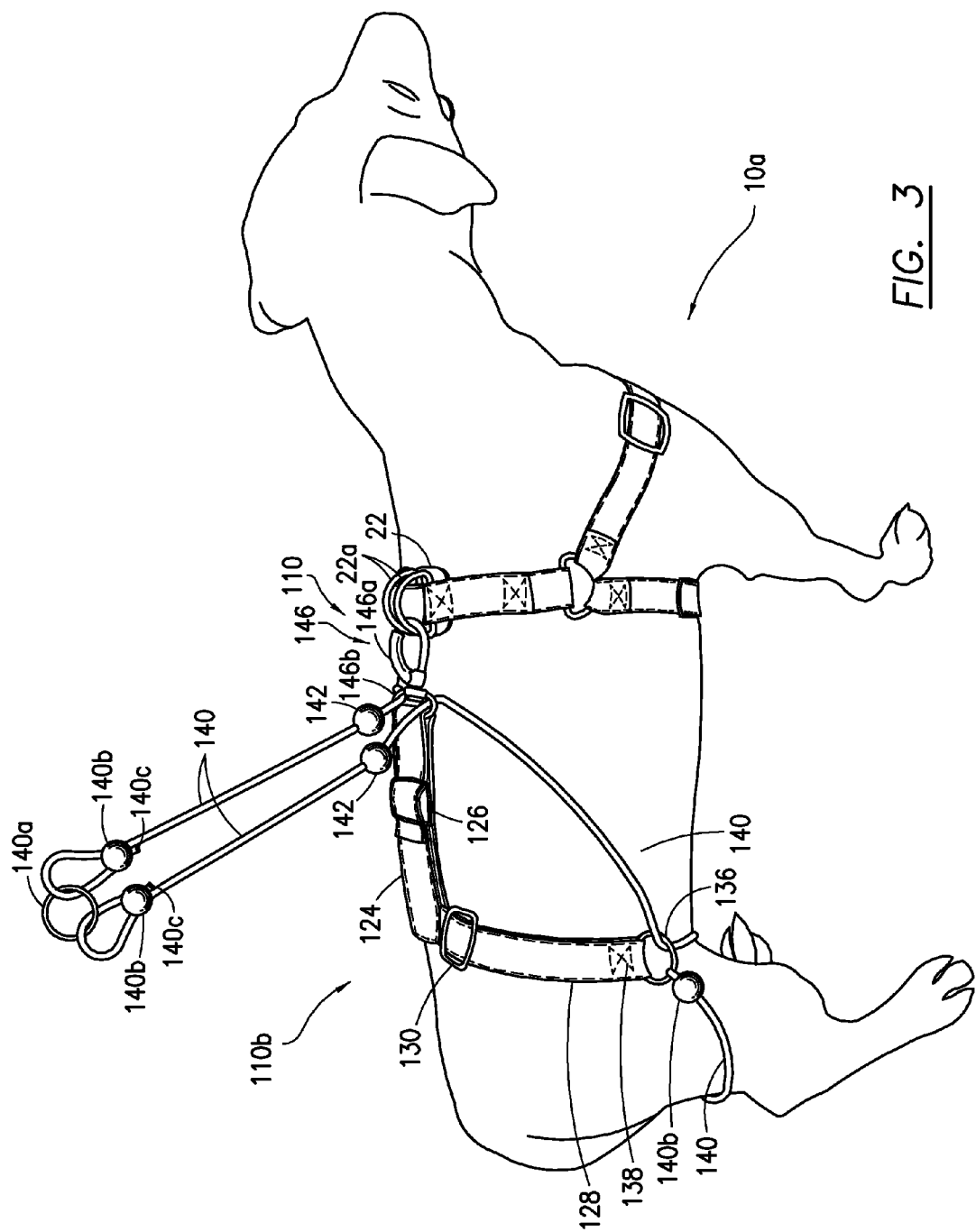
FIG. 3 shows a perspective view of an alternate embodiment of the present invention.

Referring now to FIG. 3, an alternate embodiment of the control harness 110 is shown disposed on a dog. The control harness 110 is the combination of a conventional adjustable dog harness 10a, which is well known in the art, and a control extension 110b that is attached to the dog harness 10a. The conventional dog harness 10a remains unchanged as described in FIGS. 1 and 2.

Two identical side control cords 140 are a part of and extend from the control extension 110b to an adjustable length, and provide the primary restraining action. At one end, the each control cord 140 encircles one of the dog's hind legs. The control cords 140 are each attached at their other end to a leash "O" ring 140a, which provides place for a conventional dog leash to be attached. The leash "O" ring 140a can be a basic "O" ring or a double sided "O" ring.

The control extension 110b of the alternate embodiment is similarly comprised of several narrow thin but very strong straps preferably made of an artificial fabric such as nylon. To attach the control extension 110b to the dog harness 10a, an "O" clip 146 is attached to the center strap 124 of the control extension 110b is attached to the "D" rings 22a at the midsection along the dog's spine area. The "O" clip 146 has a front area 146a with a circular snap hook that is attached to a rear area 146b that allows a strap to be laced into it and the control cord 140 on both sides of the dog to pass through it. The center strap 124 is positioned along the mid-spinal portion of the animal from its upper-mid back to its rear hind back and is adjustable in length with a buckle 126.

The center strap 124 terminates near the rear of the dog into lateral straps 128, which are affixed perpendicular to the end of strap 124 and overlaps on each side of the dog's back terminating on each side in an "O" ring 136. Thus, the lateral straps 128 extend from each side of strap 124 down to each side of the dog. The lateral straps 128 are adjustable in length by using a buckle 130, where one buckle 130 is located on the lateral straps on each side of the strap 124, to accommodate different size dogs. In all, the upper spine strap 124 and the lateral straps 128 operate in a similar manner to the primary embodiment.

Attached on each end of the lateral straps 128 are side "O" rings 136, the lateral straps 128 pass through the side "O" rings 136 and fold back onto themselves, where they are firmly attached by threads 138 that are sewn into the lateral straps 128. This creates a permanent attachment of the side "O" rings 136. The lateral straps 128 shown in FIG. 3 appear on the left side of the dog in an identical manner.

The two identical control cords 140 are made of the same strong material as the first embodiment. Each control cord 140 begins at the side "O" ring 136, where it is permanently connected by having the end of the control cord 140 looped around the "O" ring 136 and locked in position, preferably by a permanent cord stop 140b. The control cord 140 could also be locked into position by being tied into a knot on itself. The control cords 140 each then pass to the rear of one of the dog's hind legs and then completely around the hind leg, where it passes through the side "O" ring 136 that it is attached to. The control cords 140 each then run up opposing sides of the dog to the dog's back, where each passes through the rear area 146b of the "O" clip 146. The rear area 146b typically is divided into a main area for the center strap 124 and two side areas for each respective control cord 140 to pass through, but it can also simple comprise the main area where the center strap 124 and control cords 140 all pass through. An adjustable cord stop 142 is positioned on each control cord 140 after it passes through the rear area 146b to control how much the side cord 140 is available towards the hind end of the dog. If too much control cord 140 is available, the control harness would be too loose on the dog. If too little control cord 140 is available, the control harness would effectively be constantly engaged and the dog would be met with constant resistance when trying to move its hind legs. Therefore, the adjustable cord stop allows the user to adjust how much control cord 140 is available below the rear area 146b.

Once the control cords 140 are passed through the rear area 146b they continue towards the user and the leash "O" ring 140a. Before engaging the leash "O" ring 140a, the control cords each pass through a two-way stopper 140b. The control cords 140 each engage the leash "O" ring 140a by passing through the leash "O" ring 140a, and encircling back toward and through the respective two way stopper 140b that the control cord 140 passed through initially. Once the control cord 140 passes through the two-way stopper 140b for the second time, the terminating end of each cord is tied in a knot 140c to prevent it from coming back through the two way stopper 140b. The control cord 140 may be crimped or have a device on it to prevent it from coming back through the two way stopper 140b.

As with the previous embodiment, the control cords 140, the lateral straps 128, and the side "O" rings 136 are strategically positioned to ensure each control cord 140 encircles one of the upper hind leg muscles of the dog. The operating and functional results also remain unchanged in this embodiment. The control cord 140 is in such a position around the upper hind leg muscles of the dog that it can restrain these muscles when less control cord 140 is made available to the control extension 110b, which forces the loops created by the control cord 140 that are around the hind legs to get smaller and smaller. In this embodiment, the user would make less control cord 140 available by pulling a conventional leash, which would be clipped to the leash "O" ring 140a and would result in both control cords 140 being pulled away from the dog simultaneously and cause the loops created by the control cord 140 that are around the hind legs to become smaller. The two-way stoppers 140b can be used to adjust the length of the control cords 140 above the dog, where moving the two-way stopper 140b towards the leash "O" ring increases said length and moving the two-way stopper 140b towards the adjustable cord stops 142 decreases said length. The two-way stopper 140b and the adjustable cord stop 142 are typically embodied in two different stoppers, but one two-way stopper could be utilized to accomplish the tasks typically accomplished by the two-way stopper 140b and the adjustable cord stop 142.

Figure 4:
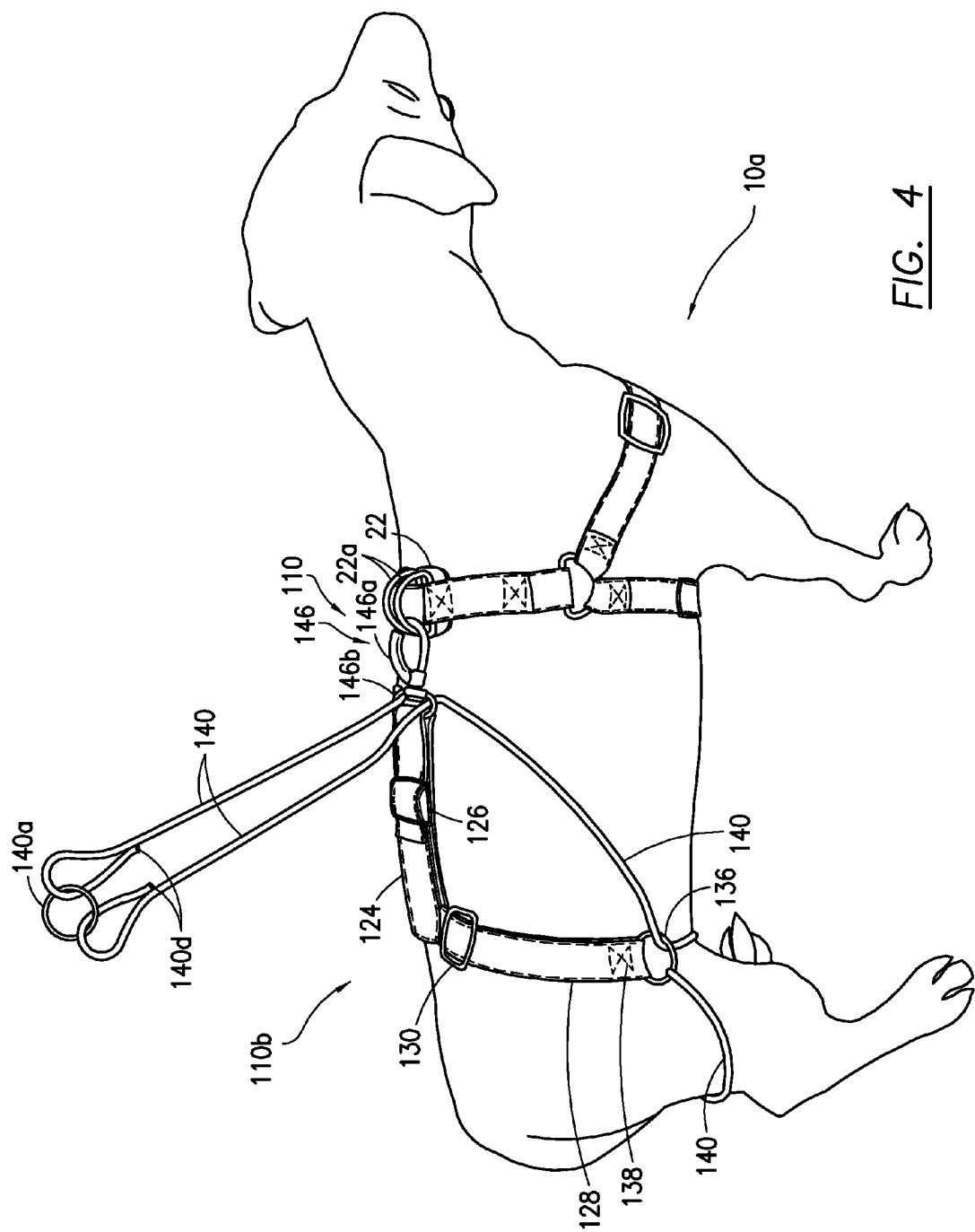
FIG. 4 shows a perspective view of another alternate embodiment of the present invention.

Referring now to FIG. 4, an alternate embodiment of the control harness 110 as shown in FIG. 3 is shown disposed on a dog. This embodiment of the control harness is substantially the same structure and performs the same functions as the previous embodiment, but does not utilize the adjustable cord stops 142 or the two-way stoppers 140b. Because the two-way stoppers are no longer used, the knot 104c is replaced by the end of the cord 140d crimped around the "O" ring 140a.

Each embodiment of the control extension 10b can be placed on a dog wearing a conventional dog collar. The control extension 10b is attached to the conventional dog collar's connector rings, but functions substantially the same with regards to the ability to put inward pressure on the dog's upper hind legs.

The instant invention has been shown and described herein in what is considered to be the most practical and preferred embodiment. It is recognized, however, that departures may be made from within the scope of the invention and that obvious modifications will occur to a person skilled in the art.

What is claimed is:

1. A control harness comprising:
   a harness extension sized to fit on a dog, said harness extension comprising one or more extension straps and a control cord having a proximal, a central and a distal portion;
   said control cord being configured such that the distal portion of the control cord encircles the thigh muscles above the kneecap of least one hind leg of the dog when said harness extension is positioned on said dog;
   said extension straps being configured to provide an extension attachment point which allows the harness extension to be removably connected to a dog harness or collar as well as at least one pivot connection point which allows the length of the distal portion of the control cord that passes through the pivot connection point and encircles the hind leg of the dog to be selectively increased and decreased; and
   wherein said central section of the control cord engages the harness extension at a location distinct from the extension attachment point so that force causing the proximal portion of said control cord to move in a direction away from distal portion of said control cord causes the distal portion of the control cord to exert force into the dog's hind leg that is encircled by the distal portion of the control cord.

2. The control harness of claim 1, where the distal portion of the control cord has a left cord section and a right cord section, said left section encircling the thigh muscles above the kneecap of the left hind leg of the dog and said right section encircling the thigh muscles above the kneecap of the right hind leg of the dog.

3. A dog harness control extension for a dog comprising:
   an extension member having a first extension strap, a second extension strap, an extension intersection and a control cord, where the first extension strap engages the second extension strap at the extension intersection, said first extension strap being perpendicular to the second extension strap;
   an extension attachment point, where said first extension strap being attachable to a dog harness at the extension attachment point and said first extension strap extending along the dog's back parallel with the dog's spine from the first extension attachment point to the extension intersection;
   at least one side cord section, said control cord comprising the cord sections;
   wherein the distal end of one of said cord sections encircles the thigh muscles above the kneecap of one of the dog's hind legs, and the proximal portion of said cord section engages the extension member at a location distinct from the from the extension attachment point and extends away from dog's body; and
   wherein when force away from the dog is exerted on the proximal portion of said cord section, inward pressure is exerted on the section of the cord section encircling the dog's hind leg.

4. The control harness of claim 3, wherein
   a free handle portion is directly connected to the proximal portion of the cord section; and
   said first extension strap uses a snap hook to removably engage a dog harness.

5. The control harness of claim 3, where said control cord comprises two side cord sections, each cord section encircling the thigh muscles above the kneecap on one of the dog's hind legs.

6. A dog control extension member for a dog comprising:
an extension member having a first extension portion, a second extension portion, an extension intersection and a control cord, where the first extension portion engages the second extension portion at the extension intersection, said first extension portion being perpendicular to the second extension portion;
an extension attachment point, where said first extension portion being attachable to a dog collar at the extension attachment point and said first extension portion extending along the dog's back parallel with the dog's spine from the first extension attachment point to the extension intersection;
at least one side cord section, said control cord comprising the cord sections;
where the distal portion of one of said cord sections encircles the thigh muscles above the kneecap of one of the dog's hind legs, and the proximal portion of said cord section engages the extension member at a location distinct from the from the extension attachment point and extends away from dog's body; and
wherein when force away from the dog is exerted on the proximal portion of said cord section, inward pressure is exerted on the section of the cord section encircling the dog's hind leg.

7. The control extension member of claim 6, wherein
a free handle portion is directly connected to the proximal portion of the cord section; and
said first extension portion uses a snap hook to removably engage a dog collar.

8. The control extension member of claim 6, where said control cord comprises two side cord sections, each cord section encircling the thigh muscles above the kneecap on one of the dog's hind legs.

* * * * *